(12) United States Patent
Lin et al.

(10) Patent No.: US 11,365,885 B2
(45) Date of Patent: Jun. 21, 2022

(54) GAS TURBINE COMBUSTOR WITH FUEL INJECTOR INCLUDING A DOWNSTREAM GUIDE MEMBER

(71) Applicant: Marvel-Tech Ltd., Shanghai (CN)

(72) Inventors: Gang Lin, Shanghai (CN); Yifeng Chen, Shanghai (CN)

(73) Assignee: Marvel-Tech Ltd., Shanghai (CN)

( * ) Notice: Subject to any disclaimer, the term of this patent is extended or adjusted under 35 U.S.C. 154(b) by 0 days.

(21) Appl. No.: 17/226,805

(22) Filed: Apr. 9, 2021

(65) Prior Publication Data

US 2021/0325046 A1    Oct. 21, 2021

(30) Foreign Application Priority Data

Apr. 15, 2020    (CN) .................. 202010294542.X

(51) Int. Cl.
*F23R 3/28*    (2006.01)
*F23R 3/14*    (2006.01)

(52) U.S. Cl.
CPC ............... *F23R 3/286* (2013.01); *F23R 3/14* (2013.01)

(58) Field of Classification Search
CPC ............ F23R 3/14; F23R 3/286; F23R 3/283
See application file for complete search history.

(56) References Cited

U.S. PATENT DOCUMENTS

| | | | |
|---|---|---|---|
| 3,831,854 A * | 8/1974 | Sato .................. | F23R 3/14 239/406 |
| 7,143,583 B2 | 12/2006 | Hayashi et al. | |
| 8,327,643 B2 * | 12/2012 | Yamamoto ............. | F23R 3/343 60/743 |
| 10,288,291 B2 * | 5/2019 | Monahan ................ | F23R 3/286 |
| 10,612,470 B2 * | 4/2020 | Matsuyama .............. | F23R 3/14 |
| 10,775,047 B2 | 9/2020 | Horikawa et al. | |
| 10,954,859 B2 * | 3/2021 | Dai .......................... | F23R 3/28 |
| 11,079,113 B2 | 8/2021 | Tada et al. | |
| 11,092,340 B2 * | 8/2021 | Matsuyama ............. | F23R 3/14 |
| 2004/0035114 A1 | 2/2004 | Hayashi et al. | |

(Continued)

FOREIGN PATENT DOCUMENTS

| | | |
|---|---|---|
| EP | 1 391 657 A2 | 2/2004 |
| EP | 2 754 963 A1 | 7/2014 |

(Continued)

*Primary Examiner* — William H Rodriguez
(74) *Attorney, Agent, or Firm* — Hamilton, Brook, Smith & Reynolds, P.C.

(57) ABSTRACT

Provided is a gas turbine combustor that achieves simplified structure and reduced axial length of the entire device. The combustor includes: a combustion liner forming a combustion chamber; a fuel injector provided at a top portion of the combustion liner; and a housing chamber located upstream of the combustion chamber and housing the fuel injector. The fuel injector includes a fuel supply tube penetrating through the housing chamber and configured to supply fuel to the combustion chamber, and a guide member provided on outer side of a downstream portion of the fuel supply tube for allowing air to pass therethrough. The fuel supply tube has, in the downstream portion, a fuel injection hole for injecting fuel to the air passing through the guide member, so as to mix the fuel with the air. The guide member supplies the air and the fuel to the combustion chamber.

6 Claims, 13 Drawing Sheets

(56) References Cited

U.S. PATENT DOCUMENTS

| | | | |
|---|---|---|---|
| 2004/0255589 A1* | 12/2004 | Yoshida | ............ F23R 3/286 60/746 |
| 2010/0248171 A1 | 9/2010 | Hayashi et al. | |
| 2012/0085834 A1 | 4/2012 | Khan et al. | |
| 2013/0019584 A1 | 1/2013 | Koizumi et al. | |
| 2014/0182294 A1 | 7/2014 | Matsumoto et al. | |
| 2017/0074519 A1 | 3/2017 | Abe et al. | |
| 2017/0082291 A1 | 3/2017 | Horikawa et al. | |
| 2019/0301369 A1 | 10/2019 | Muruganandam et al. | |
| 2021/0102703 A1 | 4/2021 | Tada et al. | |

FOREIGN PATENT DOCUMENTS

| | | |
|---|---|---|
| JP | H08-210641 A | 8/1996 |
| JP | 11-211086 A | 8/1999 |
| JP | 2012-83097 A | 4/2012 |
| JP | 2017-53276 A | 3/2017 |
| JP | 6285081 B | 2/2018 |
| WO | 2018/199289 A1 | 11/2018 |

\* cited by examiner

GAS TURBINE COMBUSTOR WITH FUEL INJECTOR INCLUDING A DOWNSTREAM GUIDE MEMBER

CROSS REFERENCE TO THE RELATED APPLICATION

This application is based on and claims Convention priority to Chinese patent application No. 202010294542.X, filed Apr. 15, 2020, the entire disclosure of which is herein incorporated by reference as a part of this application.

BACKGROUND OF THE INVENTION

Field of the Invention

The present invention relates to a gas turbine combustor applicable to a gas turbine engine.

Description of Related Art

In a gas turbine engine, proposed is a combustion method adopting a premixed combustion method which effectively reduces a NOx generation amount, e.g., a combined combustion method using a lean premixed combustion method and a diffusion combustion method in combination (JP Laid-open Patent Publication No. H08-210641).

In a combustor used in a gas turbine engine, proposed is technology of preventing local high-temperature combustion to inhibit generation of NOx and preventing a backfire phenomenon (JP Patent No. 6285081).

In JP Patent No. 6285081, a plurality of fuel injection annular portions and a plurality of combustion air annular portions are concentrically arranged alternately, and a fuel supply header and the fuel injection annular portions are connected by a plurality of branched fuel supply pipes. Thus, the structure of the combustor is complicated. In addition, a space for providing the plurality of branched fuel supply pipes is secured between the fuel supply header and the fuel injection annular portions located on the downstream side thereof, and accordingly, the entire combustor is elongated in the axial direction.

An object of the present invention is to provide a gas turbine combustor that enables simplification of the structure and reduction in the axial length of the entire device.

DISCLOSURE OF THE INVENTION

A gas turbine combustor of the present invention includes: a combustion liner forming a combustion chamber; a fuel injector provided at a top portion of the combustion liner; and a housing chamber located upstream of the combustion chamber and housing the fuel injector. The fuel injector includes a fuel supply tube penetrating through the housing chamber and configured to supply fuel to the combustion chamber, and a guide member provided on an outer side of a downstream portion of the fuel supply tube. The guide member is configured to allow air to pass therethrough. The fuel supply tube includes, in the downstream portion thereof, a fuel injection hole configured to inject fuel to the air passing through the guide member, so as to mix the fuel with the air. The guide member is configured to supply the air and the fuel therefrom into the combustion chamber. The fuel injector is designed as a module containing multiple flames, fuel injectors of the same design (cylindrical shape or polygonal shape) can be arrayed to form a tessellation, the size and shape of which can be flexibly adjusted according to different power demands and design constraints.

In the above structure, the fuel supply tube penetrates through the housing chamber and supplies the fuel to the combustion chamber. At a downstream portion of the fuel supply tube, the fuel injection hole is provided for injecting the fuel to the air passing through the guide member so as to mix the fuel with the air, and the air and the fuel are supplied from the guide member to the combustion chamber. As described above, with a simplified structure of the supply path for the fuel leading from the fuel supply tube to the guide member, the air and the fuel are supplied from the guide member to the combustion chamber. Therefore, as compared to the conventional structure in which a plurality of fuel injection annular portions and a plurality of combustion air annular portions are concentrically arranged alternately and a plurality of branched fuel supply pipes are needed, the number of parts can be decreased and the structure can be simplified. In addition, since it is not necessary to secure a space for providing the plurality of branched fuel supply pipes, or the like, the axial length of the entire device can be shortened as compared to the conventional structure.

In the present invention, an air introduction passage formed between the combustion liner and a housing covering the combustion liner, and configured to introduce the air into the housing chamber, may be provided. With this structure, the structure can be made in a reverse-flow type in which the flowing directions of the air and the fuel are opposite to each other. Thus, the entire device can be further made compact in the axial direction.

In the invention having the air introduction passage, preferably, a distribution plate for the air is provided at a part where the housing chamber and the air introduction passage communicate with each other. In this structure, the air introduced from the air introduction passage passes through the distribution plate, whereby the air is straightened into uniform flow on the downstream side of the distribution plate.

In the present invention, the guide member may have a cylindrical shape or a polygonal shape as viewed in an axial direction of the fuel supply tube, and may be formed with a guide groove that the fuel injection hole faces. In this structure, the air introduced into the guide member increases in the flow speed when passing through the guide groove, and as a result, the fuel is smoothly sucked into the air, so that mixture with the air is promoted.

In the case where the guide member has the cylindrical shape or the polygonal shape, the fuel injection hole may open in a direction of 0 to 30° with respect to a radial direction of the fuel supply tube, the guide groove of the guide member may open in a direction of 0 to 30° with respect to the axial direction of the fuel supply tube, and the fuel injector may be configured such that an air flow-out direction from the guide groove has an angle of 60° to 90° with respect to the fuel injection hole.

If the opening angle of the fuel injection hole is greater than 30° with respect to the radial direction of the fuel supply tube, workability for the fuel injection hole is reduced. In addition, if the outlet opening angle of the guide member is greater than 30° with respect to the axial direction of the fuel supply tube, fuel and air might not be favorably mixed. If the air passage direction of the guide groove is smaller than 60° or greater than 90° with respect to the fuel injection hole, mixture of fuel and air might be hampered.

In the above structure, the fuel injection hole opens in a direction of 0 to 30° with respect to the radial direction of the fuel supply tube, so that working for the fuel injection hole can be facilitated and the manufacturing cost can be reduced. The guide groove of the guide member opens in a direction of 0 to 30° with respect to the axial direction of the fuel supply tube, whereby the air and the fuel are favorably mixed to be supplied to the combustion chamber. The air passage direction from the guide groove has an angle of 60° to 90° with respect to the fuel injection hole, so that turbulence of fuel is promoted and thus the air and the fuel can be uniformly mixed.

In the case where the guide member has the cylindrical shape or the polygonal shape, a fixed swirl vane may be provided on an inner side of the guide member, for swirling the air passing between the guide member and the fuel supply tube around the guide member. In this structure, mixture of the air and the fuel is promoted by the swirl vane.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, embodiments according to the present invention will be described with reference to the drawings.

First Embodiment

A combustor according to the first embodiment of the present invention will be described with reference to FIGS. 1 to 7.

Figure 1:
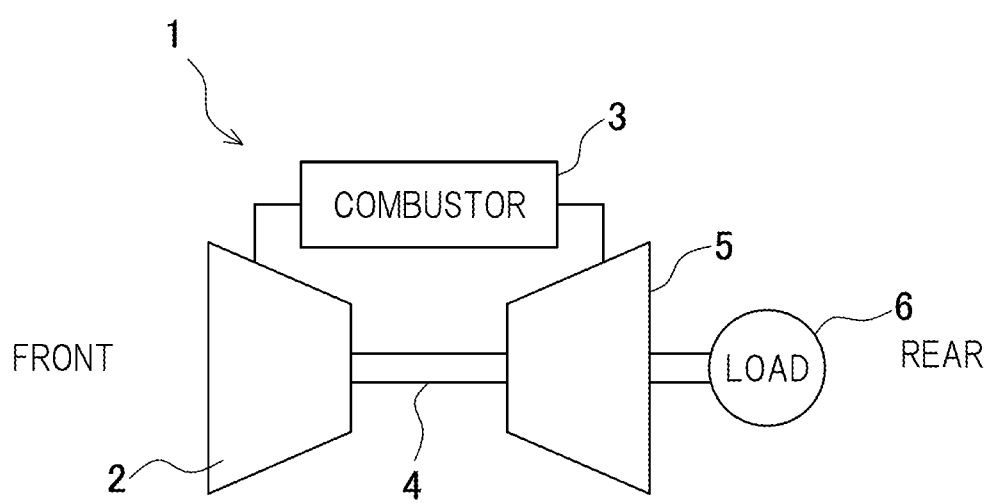
FIG. 1 is a block diagram showing the schematic configuration of a gas turbine engine to which a combustor according to the first embodiment of the present invention is applied.

As shown in FIG. 1, a gas turbine engine 1 includes a compressor 2, a combustor 3, and a turbine 5 connected to the compressor 2 via a rotary shaft 4. Hereinafter, the gas turbine engine is simply referred to as gas turbine 1.

In the gas turbine 1, introduced air is compressed by the compressor 2 and guided to the combustor 3, fuel is injected into the combustor 3 so as to be combusted together with the air, and then the turbine 5 is driven by the obtained high-temperature high-pressure combustion gas. By the driving of the turbine 5, the compressor 2 is driven. By output of the gas turbine 1, a load 6 such as an electric generator or a rotor of an aircraft is driven. As fuel to be injected into the combustor 3, for example, hydrogen gas is used. In the following description, the compressor 2 side in the axial direction of the gas turbine 1 is referred to as "front side", and the turbine 5 side in the axial direction of the gas turbine 1 is referred to as "rear side".

Figure 2:
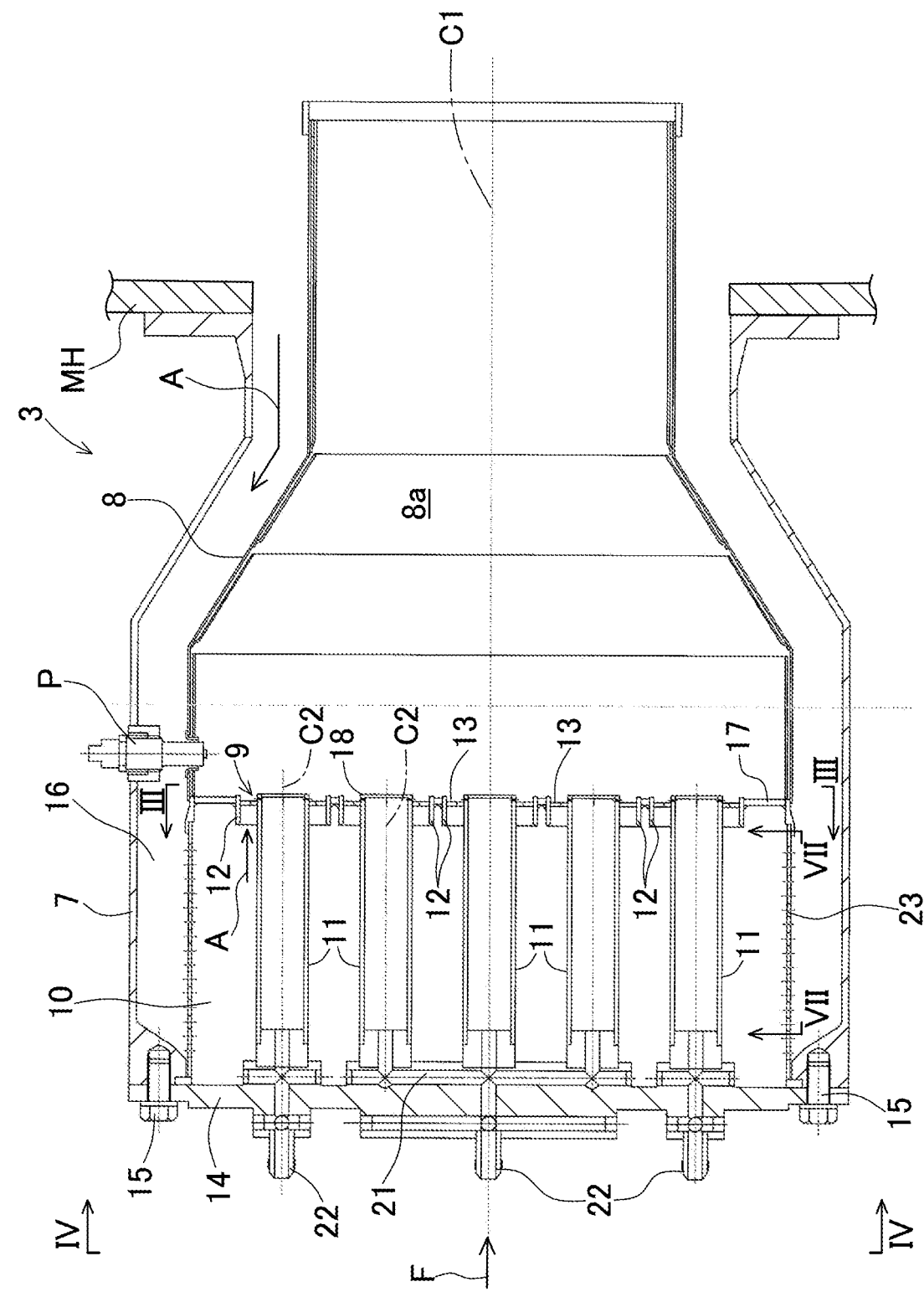
FIG. 2 is a sectional view of the combustor.

A plurality of the combustors 3 are arranged around a rotation axis of the gas turbine 1, and as shown in FIG. 2, are supported by a main housing MH of the gas turbine 1 (FIG. 1). Each combustor 3 includes a housing 7, a combustion liner 8, a fuel injector 9, and a housing chamber 10 housing the fuel injector 9. These components of the combustor 3 may be made of, for example, metal having a light weight and heat resistance.

<Housing 7>

The housing 7 is a substantially cylindrical member forming an outer barrel of the combustor 3, and houses the combustion liner 8. A spark plug P is attached near the middle portion in the longitudinal direction of the housing 7, and a tip end of the spark plug P is inserted into a combustion chamber 8a in the combustion liner 8. The housing 7 has a front end covered by an end cover 14, which is fixed by a plurality of bolts 15. At a front end part in the housing 7, the cylindrical housing chamber 10 is provided concentrically with the housing 7. The housing chamber 10 is located upstream of the combustion chamber 8a. The combustion liner 8 is provided so as to cylindrically extend from the housing chamber 10, and the combustion liner 8 and the housing chamber 10 are provided concentrically with the housing 7.

<Combustion Liner 8>

As shown in FIG. 2, an air introduction passage 16 is formed between the combustion liner 8 forming the combustion chamber 8a therein and the housing 7 covering the combustion liner 8. The air introduction passage 16 introduces air A compressed by the compressor 2 (FIG. 1), into the housing chamber 10. The combustor 3 is formed in a reverse-flow type in which the flowing directions of the air A and the fuel F are opposite to each other. The fuel F and the air A injected into the combustion chamber 8a are ignited by the spark plug P, whereby flame is formed in the combustion chamber 8a.

<Fuel Injector 9>

As shown in FIG. 2, the housing chamber 10 is located upstream of the combustion chamber 8a and houses a plurality of the fuel injectors 9. These fuel injectors 9 are provided at a top portion (most upstream portion) of the combustion liner 8, and inject the fuel F into the combustion chamber 8a. Each fuel injector 9 includes a bottomed-tubular fuel supply tube 11 which penetrates through the housing chamber 10 and supplies the fuel F to the combustion chamber 8a, and a tubular guide member 12 provided on the outer side of a downstream end of the fuel supply tube 11. The guide member 12 has a cylindrical shape as viewed in the direction of an axis C2 of the fuel supply tube 11. The fuel supply tube 11 and the guide member 12 are concentric with each other, and connected by a connection wall 13. A partition wall 17 is provided for partitioning the housing chamber 10 and the combustion chamber 8a from each other, and a plurality of the guide members 12 are attached to the partition wall 17 so as to penetrate therethrough. The fuel supply tube 11 and the guide member 12, and the connection wall 13 are welded to each other, and the guide member 12 and the partition wall 17 are also welded to each other.

Figure 5:
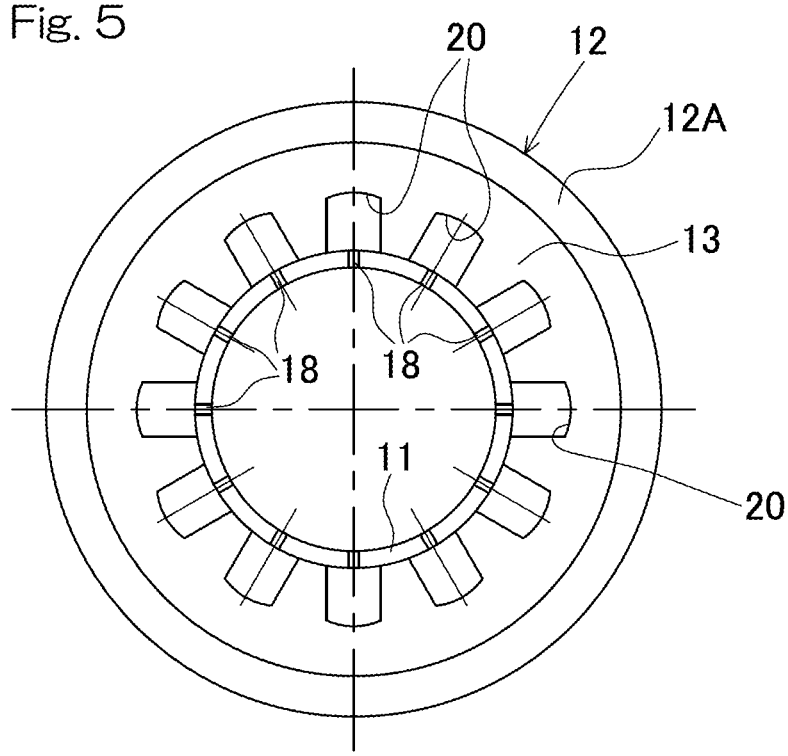
FIG. 5 is an enlarged view showing a part of FIG. 3.
Figure 6:
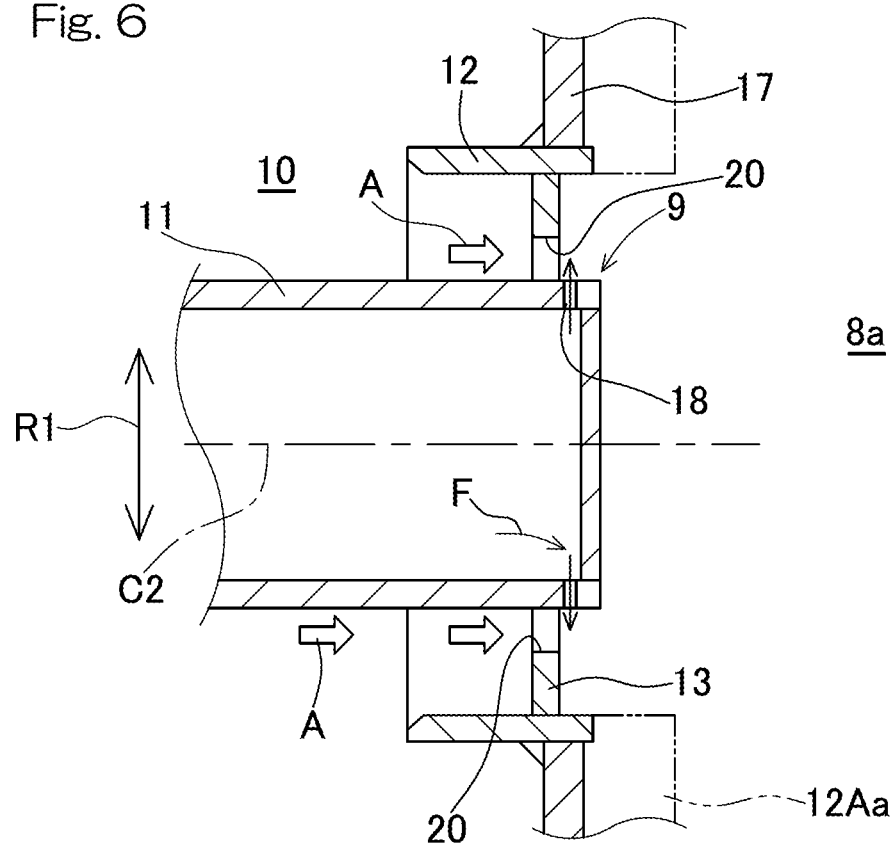
FIG. 6 is an enlarged view showing a specific part of FIG. 2.

As shown in FIG. 6, a fuel injection hole 18 is provided in a circumferential wall of the fuel supply tube 11, on a slightly downstream side of the connection wall 13. A plurality of the fuel injection holes 18 are arranged at equal intervals in the circumferential wall of the fuel supply tube 11. The air A is supplied from the upstream side to the fuel F which has been injected from the fuel injection holes 18. As shown in FIG. 5, a plurality of guide grooves 20 for allowing air to pass therethrough are formed in the connection wall 13. The plurality of guide grooves 20 are arranged at equal intervals in the circumferential direction. Each fuel injection hole 18 faces the downstream side of the guide groove 20. The guide member 12 is formed by a cylindrical guide tube 12A, and the guide groove 20 that the fuel injection hole 18 faces is formed on the inner side of the guide tube 12A.

Figure 3:
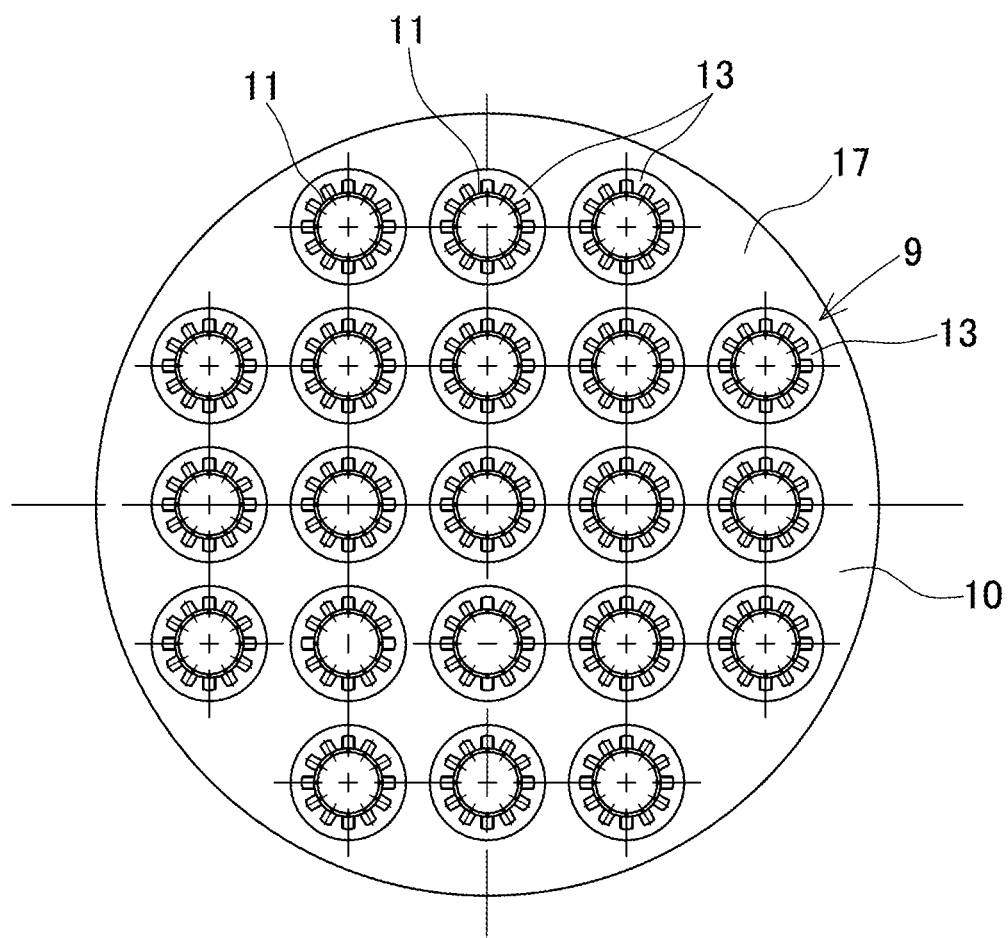
FIG. 3 is a sectional view along line III-III in FIG. 2.

As shown in FIG. 3, the fuel injectors 9 are arranged at approximately equal intervals in a grid pattern in the housing chamber 10. As shown in FIG. 6, the fuel F is injected to the inner side of the guide member 12 from the plurality of fuel injection holes 18 of the fuel supply tube 11, and the fuel F injected from the fuel injection holes 18 is mixed into the air A supplied through the guide groove 20 from the upstream side. In this example, each fuel injection hole 18 opens in a direction of 0° with respect to a radial direction R1 of the fuel supply tube 11, i.e., opens along the radial direction R1. However, the opening angle of the fuel injection hole 18 is not limited to 0°. In this example, the guide member 12 is provided so that the air flow-out direction thereof has an angle of 90° with respect to the fuel injection hole 18.

As shown in FIG. 2, upstream portions of the fuel supply tubes 11 are supported by the end cover 14, and downstream portions thereof are supported by the partition wall 17 via the guide members 12 and the connection walls 13. The fuel supply tubes 11 are arranged such that the directions of the axes C2 thereof are parallel to the direction of an axis C1 of the housing chamber 10 and the fuel supply tubes 11 are distant from each other by a predetermined interval.

Figure 4:
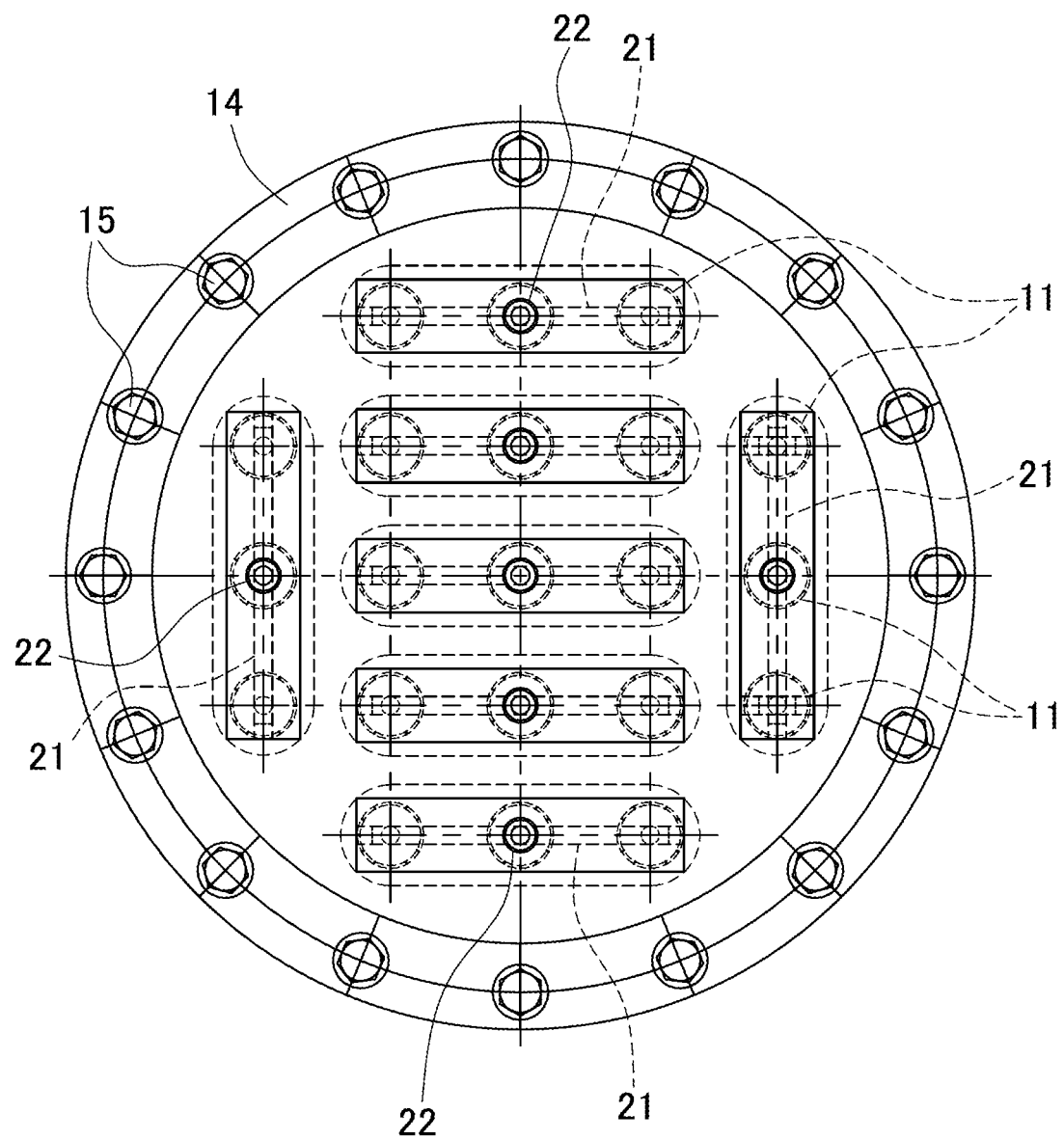
FIG. 4 is a front view as seen in the direction of line IV-IV in FIG. 2.

In this example, as shown in FIG. 4, the fuel F is supplied from the outside to each set of predetermined three fuel supply tubes 11 adjacent to each other. Upstream portions of the fuel supply tubes 11 in each set communicate with each other via a communication path 21, and the communication path 21 communicates with a fuel supply port 22 protruding from the end cover 14. The fuel F is supplied from each fuel supply port 22.

<Distribution Plate 23>

Figure 7:
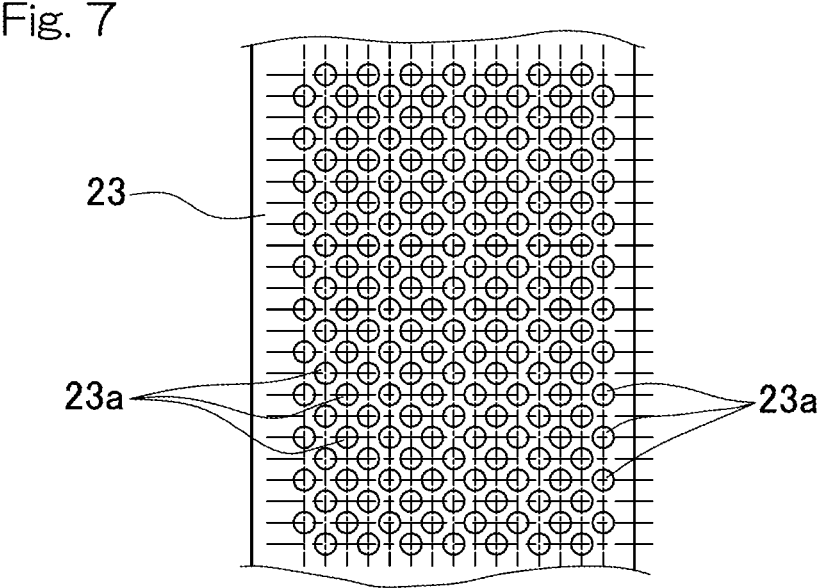
FIG. 7 is a sectional view along line VII-VII in FIG. 2.

As shown in FIG. 2, a distribution plate 23 for air is provided at a part where the housing chamber 10 and the air introduction passage 16 communicate with each other. The distribution plate 23 is formed in a cylindrical shape concentric with the direction of the axis C1 of the combustion liner 8. As shown in FIG. 7, the distribution plate 23 has a circumferential wall formed with a plurality of through holes 23a penetrating the circumferential wall in the radial direction. The through holes 23a are arranged at predetermined intervals in the circumferential direction and the axial direction. As shown in FIG. 2, the air A introduced from the air introduction passage 16 passes through the plurality of through holes 23a (FIG. 7) of the distribution plate 23, whereby the air A is formed into uniformly distributed flow on the downstream side of the distribution plate 23.

Operations and Effects

In the combustor 3 of the gas turbine 1, the plurality of fuel supply tubes 11 shown in FIG. 2 are arranged spaced from each other by a predetermined interval, and the plurality of fuel injection holes 18 are arranged in the circumferential direction at a downstream portion of each fuel supply tube 11. Therefore, the fuel F is injected from the fuel injectors 9 uniformly over the entire area of the combustion chamber 8a. Thus, on all the surfaces of the fuel injectors 9, minute flames are held at multiple points. Accordingly, occurrence of local high-temperature combustion is prevented, and generation of NOx can be suppressed. In addition, since the air A is supplied from the upstream side to the fuel F injected from the fuel injection holes 18, the flames do not enter the inner sides of the fuel injectors 9, whereby a backfire phenomenon is suppressed.

Each fuel supply tube 11 penetrates through the housing chamber 10 and supplies the fuel F to the combustion chamber 8a. At a downstream portion of the fuel supply tube 11, the fuel injection holes 18 are provided for injecting the fuel F to the inner side of the guide member 12 so as to mix the fuel F with the air A, and the air A and the fuel F are supplied from the guide member 12 to the combustion chamber 8a. As described above, with a simplified structure of the supply path for the fuel F leading from the fuel supply tube 11 to the guide member 12, the air A and the fuel F are supplied from the guide member 12 to the combustion chamber 8a. Therefore, as compared to the conventional structure (JP Patent No. 6285081) in which a plurality of fuel injection annular portions and a plurality of combustion air annular portions are concentrically arranged alternately and a plurality of branched fuel supply pipes are needed, the number of parts can be reduced and the structure can be simplified. In addition, since it is not necessary to secure a space for providing the plurality of branched fuel supply pipes, or the like, the axial length of the entire device can be shortened as compared to the conventional structure.

The air introduction passage 16 for introducing the air A into the housing chamber 10 is formed between the combustion liner 8 and the housing 7. Therefore, the structure can be made in a reverse-flow type in which the flowing directions of the air A and the fuel F are opposite to each other. Thus, the entire device can be further made compact in the axial direction.

The guide groove 20 that the fuel injection hole 18 faces is formed on the inner side of the guide member 12. Therefore, the air A introduced to the inner side of the guide member 12 increases in the flow speed when passing through the guide groove 20, and as a result, the fuel F is smoothly sucked into the air A, so that mixture with the air A is promoted.

The fuel injection hole 18 opens in a direction of 0° with respect to the radial direction R1 of the fuel supply tube 11. Therefore, working for the fuel injection hole 18 can be facilitated and the manufacturing cost can be reduced. The guide member 12 opens in a direction of 0° with respect to the axis C2 of the fuel supply tube 11. Therefore, the passage in the guide member 12, i.e., the air flow-out direction has an angle of 90° with respect to the fuel injection hole 18, so that the air A transversely crosses the fuel F, thus promoting mixture of the air A and the fuel F.

OTHER EMBODIMENTS

In the following description, when only part of the structure is described, the other part of the structure is the same as that previously described.

Second Embodiment

Figure 8:
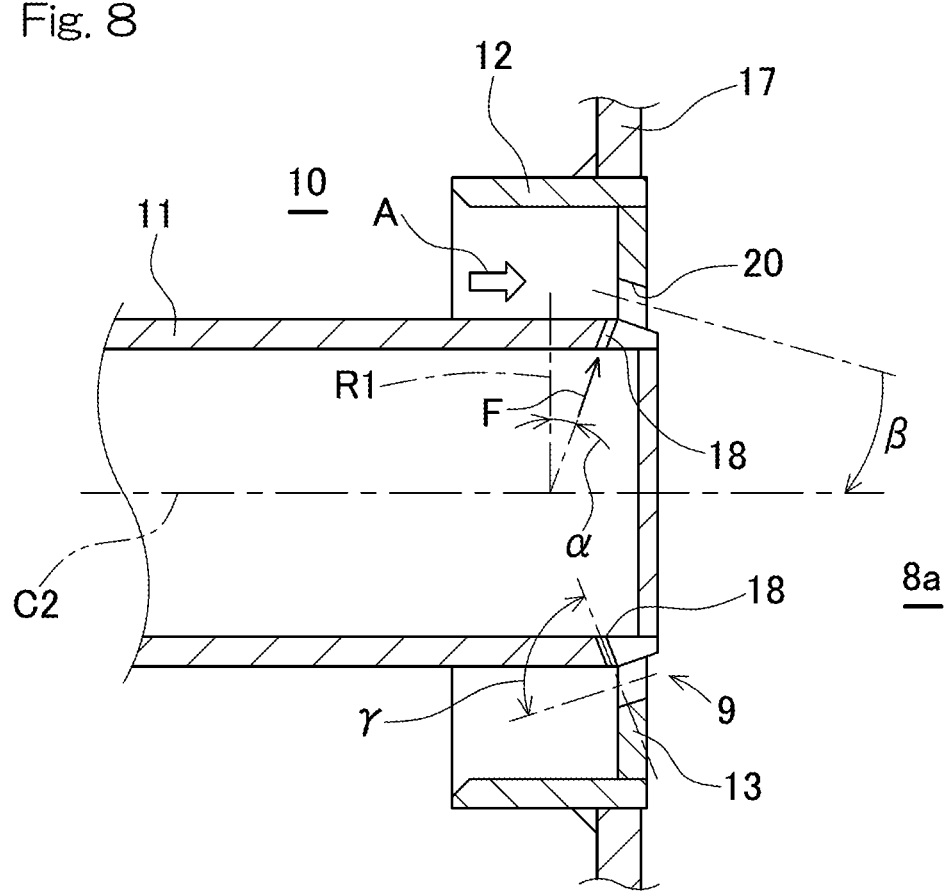
FIG. 8 is an enlarged sectional view showing a part of a combustor according to the second embodiment of the present invention.

As shown in FIG. 8, the fuel injection hole 18 may be provided on the upstream side of the guide groove 20. In this example, the fuel injection hole 18 opens so as to be inclined toward the downstream side by a predetermined angle α with respect to the radial direction R1 of the fuel supply tube 11. The angle α is 0 to 30° (+30°). Regarding the angle α, the inclination angle of the fuel injection hole 18 in a case where the fuel injection hole 18 is inclined toward the downstream side in the axial direction as approaching toward the outer side in the radial direction, is defined as a "positive" inclination angle.

The guide groove 20 of the guide member 12 opens in a direction of a predetermined angle β with respect to the axis C2 of the fuel supply tube 11. The angle β is 0 to 30° (+30°). Regarding the angle θ, the inclination angle in a case where the guide groove 20 is inclined outward in the radial direction as approaching the upstream side, is defined as a "positive" inclination angle.

The passage direction of the guide groove 20 of the guide member 12 has a predetermined angle γ with respect to the fuel injection hole 18. The angle γ is 60° to 90°.

The angles α, β, γ are angles arbitrarily determined in accordance with designing or the like, and for example, determined by finding appropriate angles through one or both of a test and a simulation, or the like.

Since the fuel injection hole 18 opens in a direction of 0 to 30° with respect to the radial direction R1 of the fuel supply tube 11, working for the fuel injection hole 18 can be facilitated and the manufacturing cost can be reduced. Since the guide groove 20 of the guide member 12 opens in a direction of 0 to 30° with respect to the axis C2 of the fuel supply tube 11, the air A and the fuel F are favorably mixed to be supplied to the combustion chamber 8a. Since the passage direction of the guide member 12 has an angle of 60° to 90° with respect to the fuel injection hole 18, the fuel F is smoothly injected, whereby the air A and the fuel F can be uniformly mixed.

Also in the structure (see FIG. 6) in which the fuel injection hole 18 is provided on the downstream side of the guide groove 20, it is preferable that the angle α is 0 to 30°, the angle β is 0 to 30°, and the angle γ is 60° to 90°.

Third Embodiment

<Swirl Vane>

Figure 9:
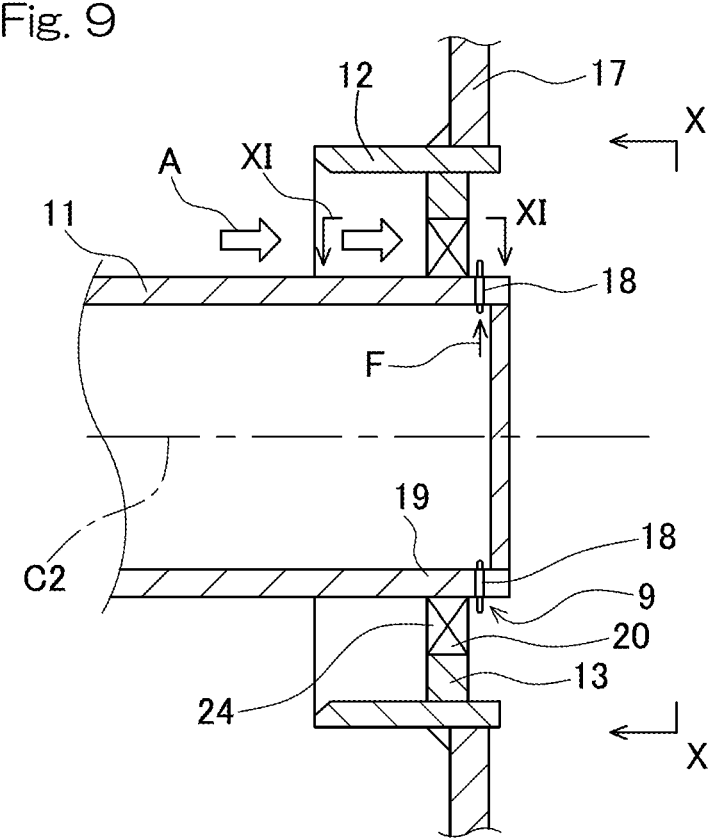
FIG. 9 is an enlarged sectional view showing a part of a combustor according to the third embodiment of the present invention.
Figure 10:
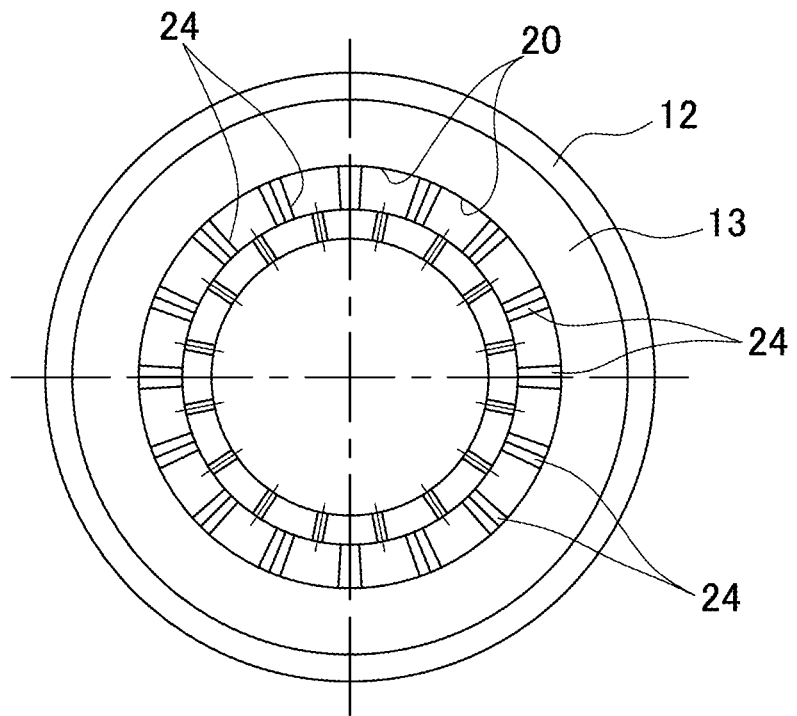
FIG. 10 is a back view as seen in the direction of line X-X in FIG. 9.
Figure 11:
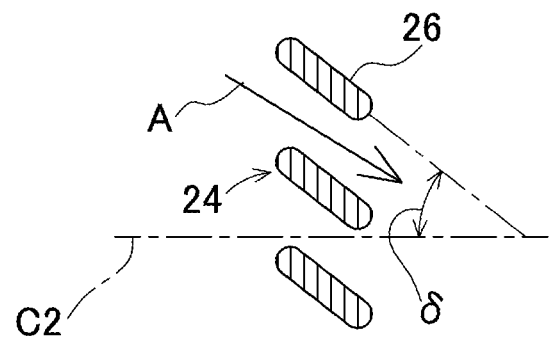
FIG. 11 is a circumferential-direction sectional view showing a part of swirl vanes of the combustor.

As shown in FIG. 9 and FIG. 10, on the inner side of the guide member 12, fixed swirl vanes 24 are provided for swirl the air A passing between the connection wall 13 and the fuel supply tube 11 around in the guide tube 12A. The swirl vanes 24 are formed by a plurality of inclined vanes 26 (FIG. 11) fixed between the inner and outer rings, and are generally called a swirler. As shown in FIG. 11 (sectional view along line XI-XI in FIG. 9), the vanes 26 are inclined by an inclination angle δ with respect to the axis C2 of the guide member 12 (FIG. 10). The inclination angle δ is 15° to 45°, and preferably, 20° to 40°.

In this structure, by the swirl vanes 24, mixture of the air A and the fuel F is promoted and a swirl is formed inside the combustion chamber 8a, whereby a stable flame is obtained. It is noted that, if the inclination angle δ of the vanes 26 is greater than 45°, the swirl becomes excessively strong, so that the speed of downstream advancement of mixture gas of the air A and the fuel F is reduced and thus a backfire phenomenon might occur.

Fourth Embodiment

<Honeycomb Burner>

Figure 12:
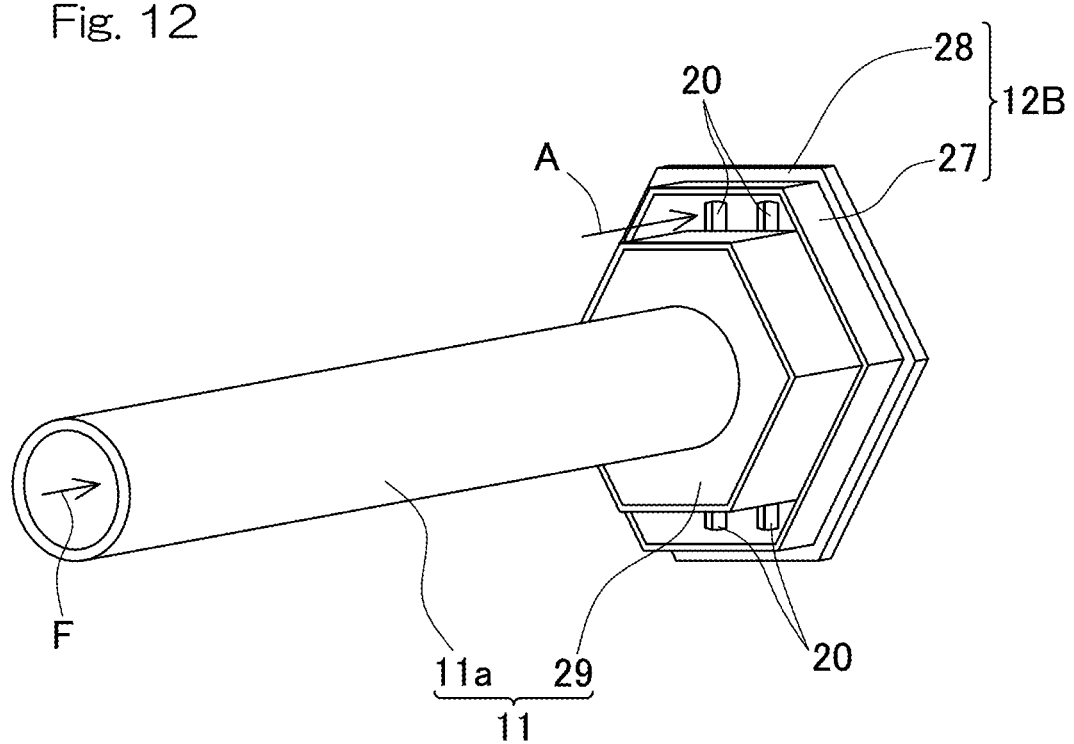
FIG. 12 is a perspective view of a fuel injector of a combustor according to the fourth embodiment of the present invention, as seen obliquely from the upstream side.
Figure 13:
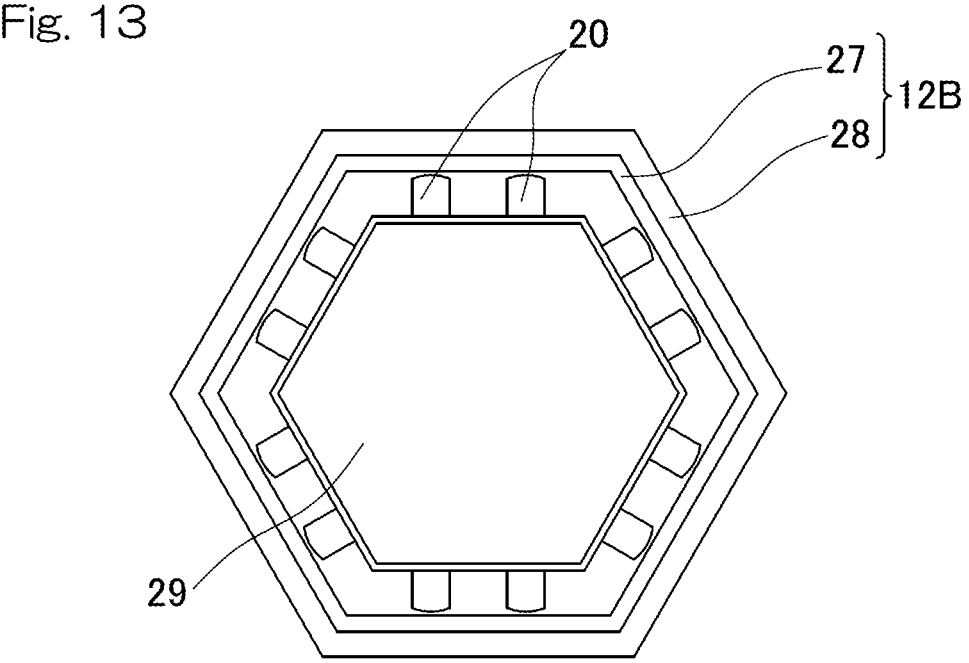
FIG. 13 is a back view of the fuel injector as seen from the downstream side.
Figure 14:
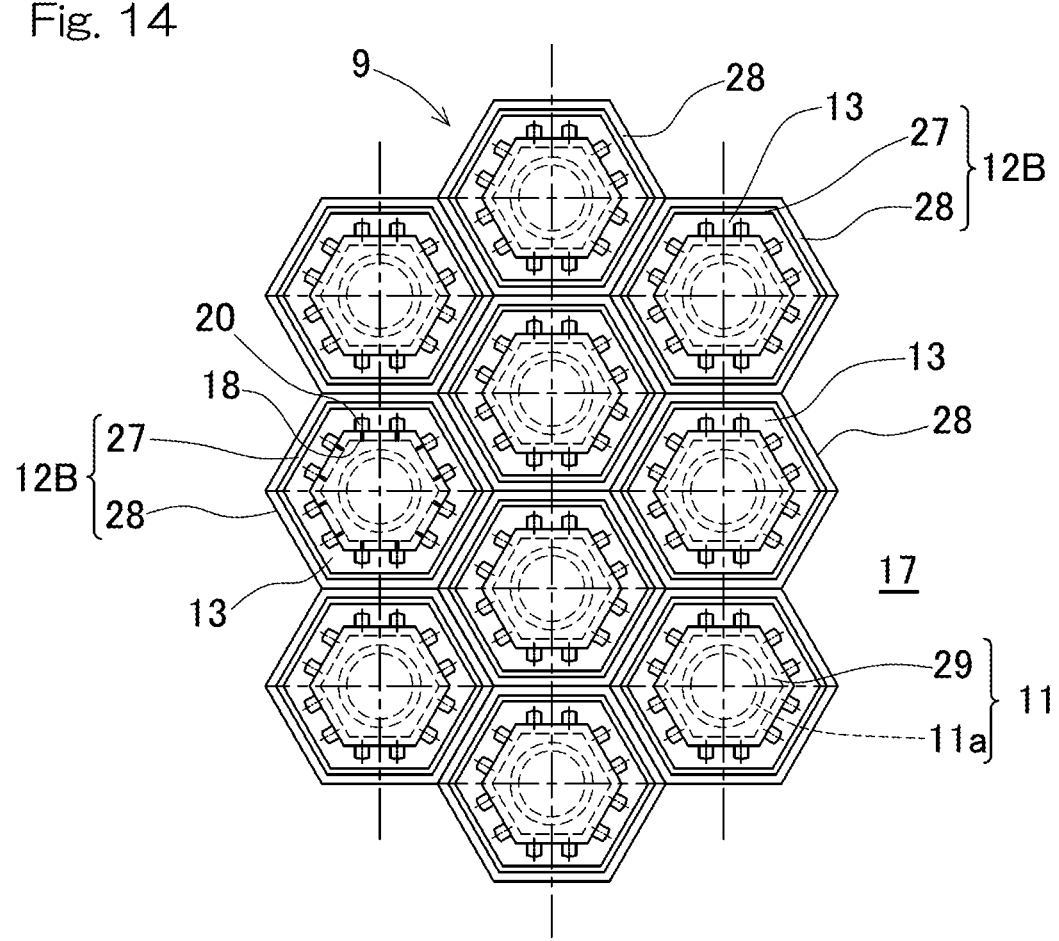
FIG. 14 is a back view showing arrangement of the fuel injectors.

FIG. 12 to FIG. 15 show the fuel injector 9 of the present embodiment. In FIG. 12, a guide member 12B in this example has a guide wall 27 having a hexagonal shape as seen in the direction of the axis C2 of the fuel supply tube 11, and an outer peripheral protrusion 28 joined to the outer peripheral surface of the guide wall 27. As shown in FIG. 13, the outer peripheral protrusion 28 is formed in a hexagonal frame shape in a front view. As shown in FIG. 14, outer edges of a plurality of outer peripheral protrusions 28 adjacent to each other in the radial direction are joined to each other without gaps, whereby a plurality of fuel injectors 9 are arranged in a honeycomb shape. The outer peripheral protrusions 28 located on the radially outermost side in FIG. 14 are joined to the partition wall 17. The above joining for each part is made by welding, for example.

Figure 16:
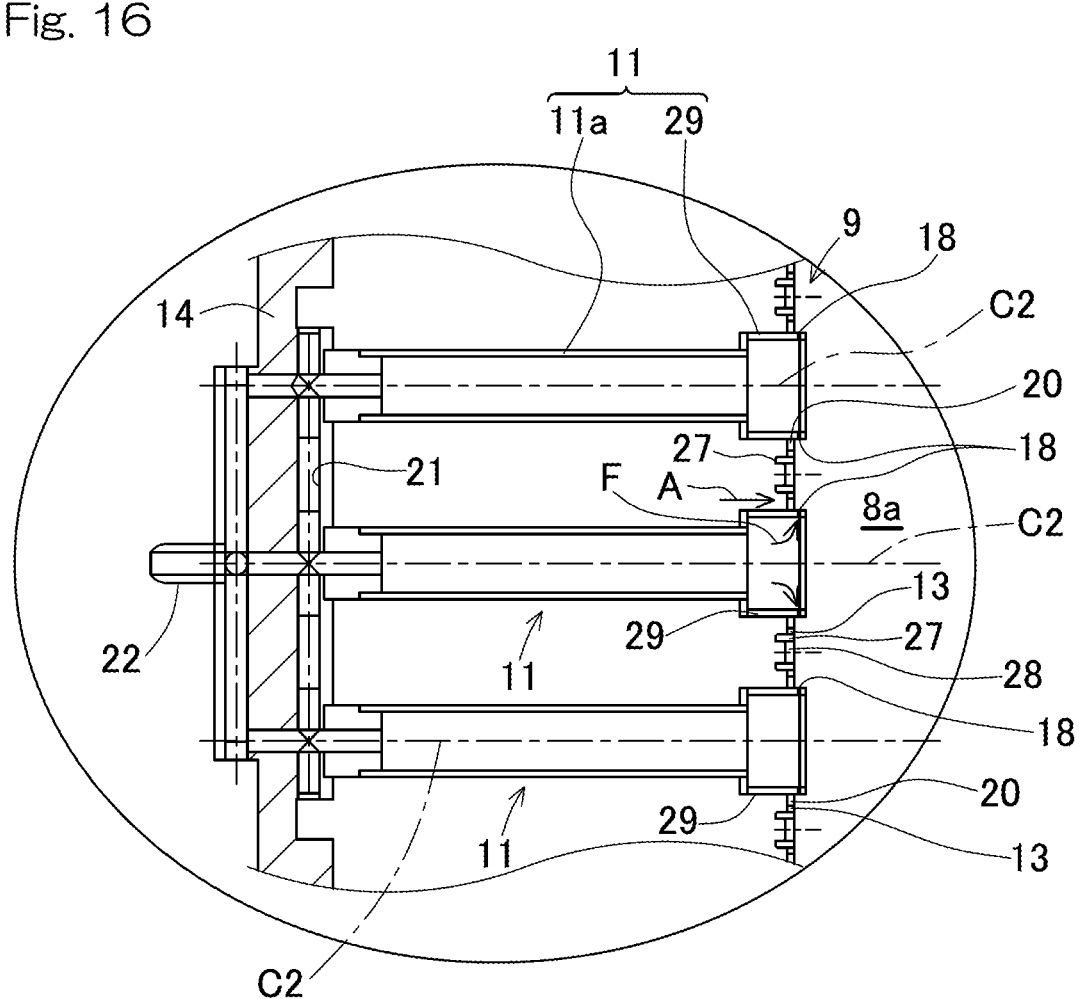
FIG. 16 is a vertical sectional view of the fuel injectors.

As shown in FIG. 12, the fuel supply tube 11 has a cylindrical fuel supply tube body 11a and a bottomed hexagonal cylindrical box 29 connected to a downstream end of the fuel supply tube body 11a. As shown in FIG. 16, the box 29 communicates with the fuel supply tube body 11a and is concentric with the fuel supply tube body 11a. The box 29 and the guide wall 27 are concentric with each other and connected by the connection wall 13.

Figure 15:
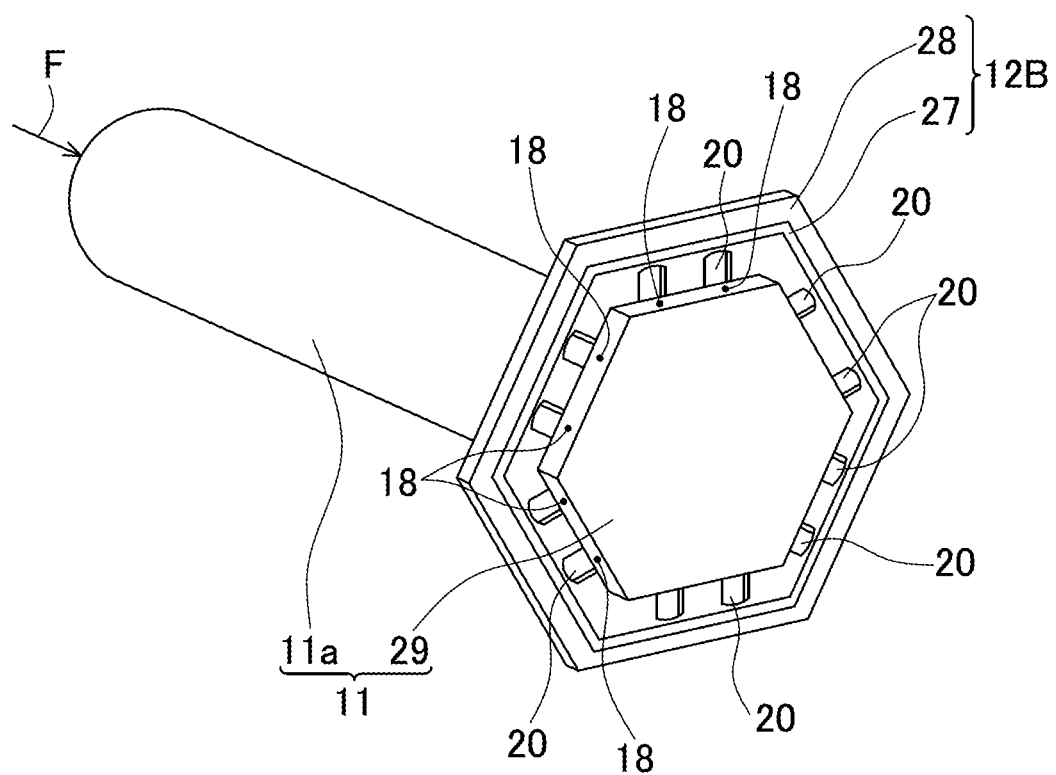
FIG. 15 is a perspective view showing the fuel injector as seen obliquely from the downstream side.

The fuel injection hole 18 is provided in a peripheral wall of the box 29, on a slightly downstream side of the connection wall 13. As shown in FIG. 15, a plurality of fuel injection holes 18 are arranged at predetermined intervals in the peripheral wall of the box 29. Each fuel injection hole 18 faces the downstream side of the guide groove 20 formed in the connection wall 13. As shown in FIG. 16, the fuel injection holes 18 in this example open in directions respectively perpendicular to the outer peripheral wall surfaces of the hexagonal tube of the box 29. The guide wall 27 extends in parallel to the axis C2 of the fuel supply tube body 11a.

As described above, the plurality of fuel injectors 9 are arranged densely in a honeycomb shape. Therefore, more fuel injectors 9 than in the other embodiments are arranged, whereby mixture of the air A and the fuel F can be more uniformed. The fuel injection holes 18 open in directions respectively perpendicular to the outer peripheral wall surfaces of the hexagonal tube of the box 29, whereby working for the fuel injection holes 18 can be facilitated and the manufacturing cost can be reduced. Since the guide wall 27 extends in parallel to the axis C2 of the fuel supply tube body 11a, the passage direction of the guide wall 27, i.e., the air flow-out direction has an angle of 90° with respect to the fuel injection hole 18. Therefore, the air A transversely crosses the fuel F, thus promoting mixture of the air A and the fuel F. Besides, the same operations and effects as in the above embodiments are provided. It is noted that the guide wall 27 is not limited to a hexagonal shape, but may be a polygonal shape with three or more sides.

<Simulation Result of Computational Fluid Dynamics>

Figure 17:
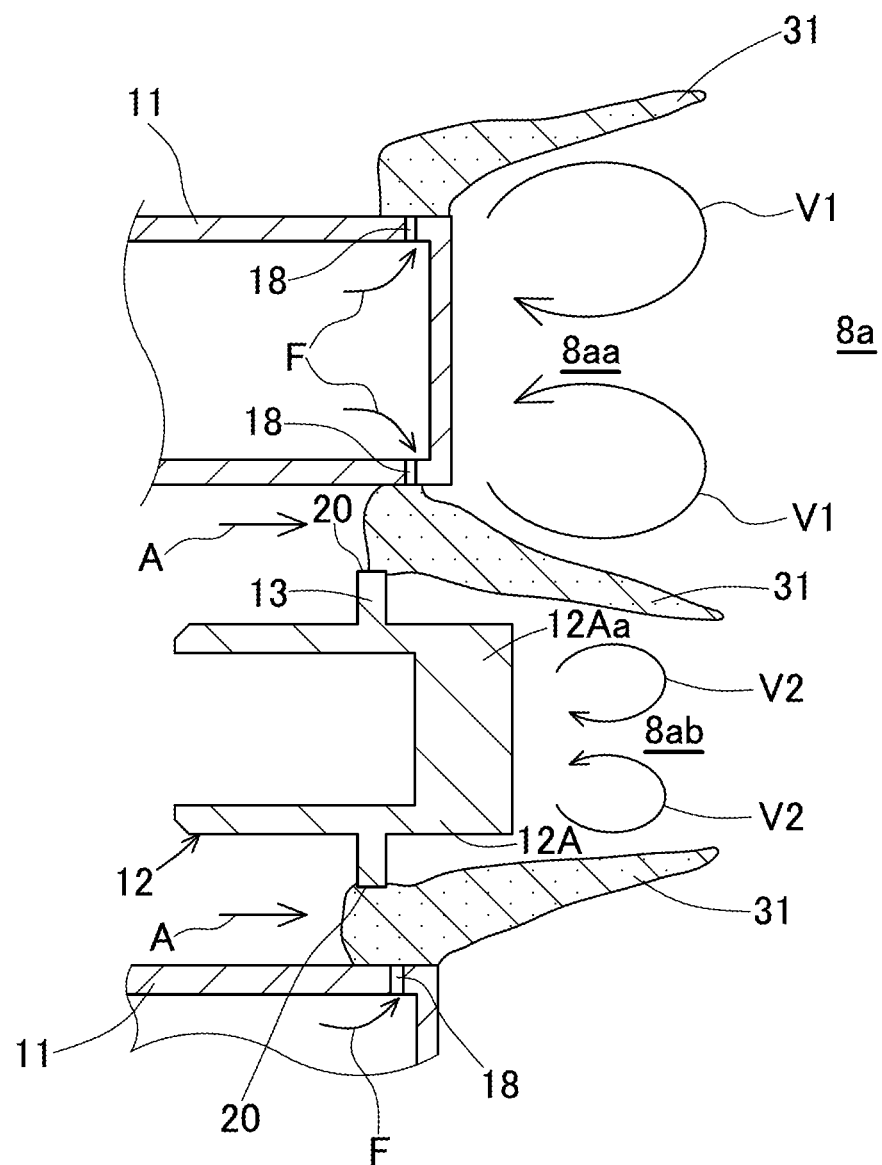
FIG. 17 is a schematic view showing a simulation result of the combustor according to the first embodiment.

FIG. 17 shows a simulation result of the combustor according to the first embodiment (FIGS. 2 to 7). In the simulation in FIG. 17, a protruding portion 12Aa (indicated by a two-dot dashed line in FIG. 6) which is a downstream end of the guide tube 12A slightly extends toward the downstream side with respect to a downstream end of the fuel supply tube 11. According to the simulation result, inside the combustion chamber 8a, a vortex V1 is generated in a low-pressure area Baa arising on the downstream side of the fuel supply tube 11. Radial-direction expansion of the vortex V1 is suppressed by the air A passing through the guide groove 20, and mixture of the fuel F and the air A in the low-pressure area Baa is promoted. In addition, the size of a backflow vortex V2 generated in a low-pressure area Bab on the downstream side of the protruding portion 12Aa is ensured, and mixture in the low-pressure area Bab is also promoted. Thus, combustion gas is readily uniformed, so that the flames are stabilized.

Figure 18:
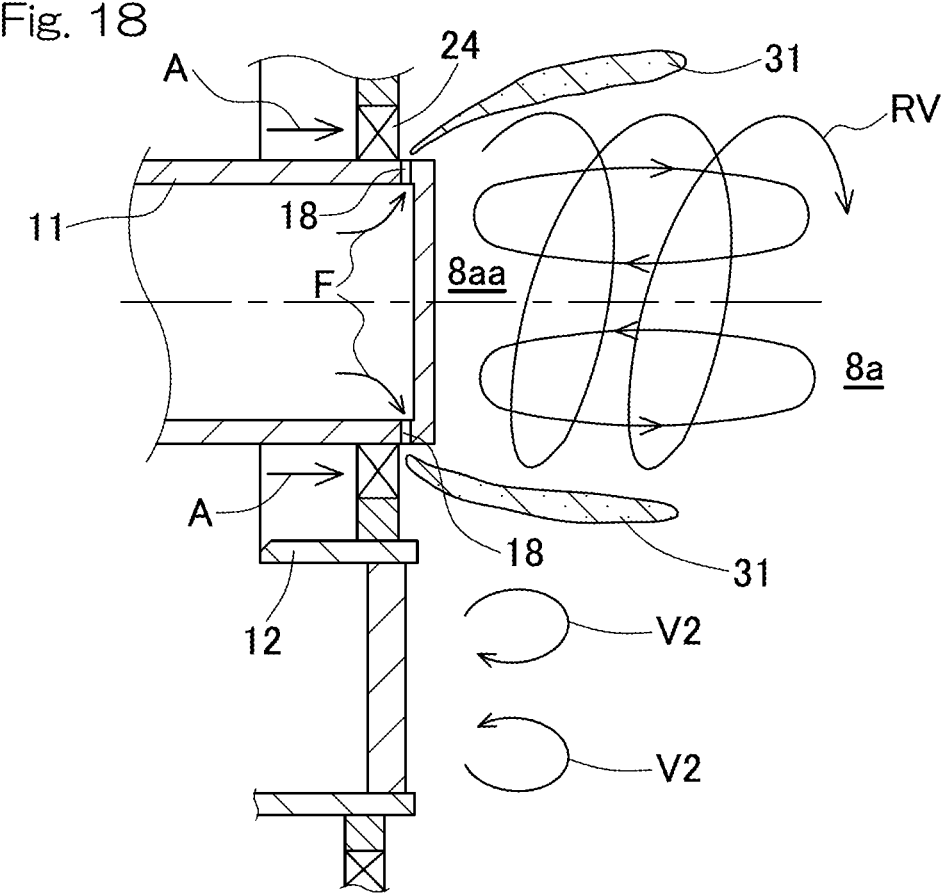
FIG. 18 is a schematic view showing a simulation result of the combustor according to the third embodiment.

According to a simulation result of the combustor in the third embodiment (FIG. 9 to FIG. 11) shown in FIG. 18, a swirl RV is formed on the downstream side of the fuel supply tube 11 by the swirl vanes 24 and the mixture gas expands in the radial direction, so that a backflow area is formed. Thus, stable flames 31 extending toward the downstream side are obtained.

Figure 19:
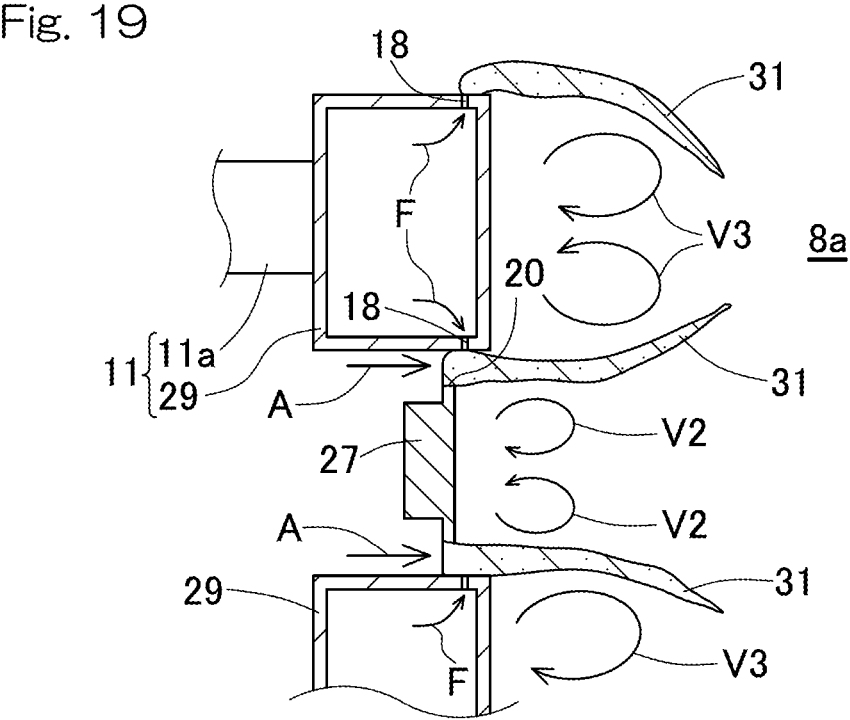
FIG. 19 is a schematic view showing a simulation result of the combustor according to the fourth embodiment.

According to a simulation result of the combustor of a honeycomb burner type in the fourth embodiment (FIGS. 12 to 16) shown in FIG. 19, inside the combustion chamber 8a, a backflow vortex V3 is generated on the downstream side of the box 29, and as a result, the combustion gas can be uniformed and the flames are stabilized.

In the present invention, in a case of a small-sized combustor 3, the number of the fuel supply tubes 11 may be one.

The fuel F used in the combustor 3 is not limited to hydrogen gas. For example, the fuel F may be mixture fuel of hydrogen gas and another fuel gas (natural gas, CO, etc.) or may be another fuel gas (natural gas, CO, etc.) not including hydrogen.

Although the present invention has been described above in connection with the preferred embodiments with reference to the accompanying drawings, numerous additions, modifications, or deletions can be made without departing from the gist of the present invention. Accordingly, such additions, modifications, or deletions are to be construed as included in the scope of the present invention.

REFERENCE NUMERALS

1 . . . gas turbine
3 . . . combustor
7 . . . housing
8 . . . combustion liner
8a . . . combustion chamber
9 . . . fuel injector
10 . . . housing chamber
11 . . . fuel supply tube
12, 12B . . . guide member
16 . . . air introduction passage
18 . . . fuel injection hole
20 . . . guide groove
23 . . . distribution plate
24 . . . swirl vane
A . . . air
F . . . fuel

What is claimed is:

1. A gas turbine combustor comprising:
a combustion liner forming a combustion chamber;
a fuel injector provided at a top portion of the combustion liner; and
a housing chamber located upstream of the combustion chamber and housing the fuel injector, wherein
the fuel injector includes
a fuel supply tube penetrating through the housing chamber and configured to supply fuel to the combustion chamber, and
a guide member provided on an outer side of a downstream portion of the fuel supply tube, the guide member being configured to allow air to pass therethrough,
the fuel supply tube and the guide member are connected by a connection wall,
the fuel supply tube includes, in the downstream portion thereof, a fuel injection hole configured to inject fuel to the air passing through the guide member therein, so as to mix the fuel with the air,
a plurality of guide grooves that the fuel injection hole faces are formed on the connection wall, the guide grooves being arranged in the circumferential direction of the guide member, and
the guide member is configured to supply the air and the fuel therefrom into the combustion chamber.

2. The gas turbine combustor as claimed in claim 1, further comprising an air introduction passage formed between the combustion liner and a housing covering the combustion liner, and configured to introduce the air into the housing chamber.

3. The gas turbine combustor as claimed in claim 2, further comprising a distribution plate for the air, provided at a part where the housing chamber and the air introduction passage communicate with each other.

4. The gas turbine combustor as claimed in claim 1, wherein the guide member has a cylindrical shape or a polygonal shape as viewed in an axial direction of the fuel supply tube.

5. The gas turbine combustor as claimed in claim 4, wherein
the fuel injection hole opens in a direction of 0 to 30° with respect to a radial direction of the fuel supply tube,
the guide groove of the guide member opens in a direction of 0 to 30° with respect to the axial direction of the fuel supply tube, and
the fuel injector is configured such that an air flow-out direction from the guide groove has an angle of 60° to 90° with respect to the fuel injection hole.

6. The gas turbine combustor as claimed in claim 4, further comprising a fixed swirl vane provided on an inner side of the guide member and configured to swirl the air passing between the guide member and the fuel supply tube around the guide member.

\* \* \* \* \*